US012492115B2

(12) United States Patent
Alexander et al.

(10) Patent No.: US 12,492,115 B2
(45) Date of Patent: Dec. 9, 2025

(54) FLUID FILLING SYSTEM

(71) Applicant: FNA Group, Inc., Pleasant Prairie, WI (US)

(72) Inventors: Chris Alexander, Park Ridge, IL (US); Richard J. Gilpatrick, Burlington, WI (US); Robert E. Dowd, Oconomowoc, WI (US); Shawn M. Mulkins, Zion, IL (US)

(73) Assignee: FNA GROUP, INC., Pleasant Prairie, WI (US)

( * ) Notice: Subject to any disclaimer, the term of this patent is extended or adjusted under 35 U.S.C. 154(b) by 0 days.

(21) Appl. No.: 17/189,493

(22) Filed: Mar. 2, 2021

(65) Prior Publication Data

US 2021/0269197 A1 Sep. 2, 2021

Related U.S. Application Data

(60) Provisional application No. 62/983,879, filed on Mar. 2, 2020.

(51) Int. Cl.
*B65D 3/16* (2006.01)
*B65D 33/16* (2006.01)
*B65D 41/04* (2006.01)
*B67D 7/04* (2010.01)

(52) U.S. Cl.
CPC ............... *B67D 7/04* (2013.01); *B65D 33/16* (2013.01); *B65D 41/0414* (2013.01)

(58) Field of Classification Search
CPC ............................ B65D 33/16; B65D 41/0414
See application file for complete search history.

(56) References Cited

U.S. PATENT DOCUMENTS 8,701,906 B1 * 4/2014 Anderson .............. B65D 41/20 215/DIG. 8
10,696,457 B2 * 6/2020 Ohkubo ................. B65D 75/44
2014/0175099 A1 * 6/2014 Seguin ................. B65D 51/225 220/278
2017/0057705 A1 * 3/2017 Bailey .................. B65D 51/245
(Continued)

FOREIGN PATENT DOCUMENTS

CN 102659064 A 9/2012
KR 10-2009-0057098 A 6/2009
WO 2017/094880 A1 6/2017

OTHER PUBLICATIONS

Original and Translation of WO2017094880A1; Taruno Shinsuke; Eguchi Tetsuaki; Aoki Tatsuro; Jun. 8, 2017.*
(Continued)

*Primary Examiner* — Paul J Gray
(74) *Attorney, Agent, or Firm* — Brian J. Colandreo; Jeffrey T. Placker; Holland & Knight LLP

(57) ABSTRACT

Systems and methods are provided for transferring fluid between a container and a reservoir. In an embodiment, a system may include a container having an interior volume configured to hold a volume of fluid. An adapter may be associated with the container for providing fluid communication with the volume of fluid. A receiver may be configured to be fluidly coupled with a reservoir. The receiver may be configured to releasably engage the adapter, and may include a valve configured to be opened when the adapter is engaged with the receiver to allow fluid transfer between the container and the reservoir.

16 Claims, 10 Drawing Sheets

(56) References Cited

U.S. PATENT DOCUMENTS

| | | | | |
|---|---|---|---|---|
| 2018/0370673 | A1 | 12/2018 | Taruno et al. | |
| 2019/0077586 | A1* | 3/2019 | Cafaro | B65D 41/50 |

OTHER PUBLICATIONS

Notice of Allowance cited in related Mexican Application Serial No. MX/A/2021/002445 on Jul. 24, 2024.
Office Action cited in related Chinese Application Serial No. 202110232653.2 dated Aug. 15, 2024.

* cited by examiner

FLUID FILLING SYSTEM

CROSS-REFERENCE TO RELATED APPLICATION

This application claims the benefit of U.S. provisional application Ser. No. 62/983,879, entitled "FLUID FILLING SYSTEM," filed on Mar. 2, 2020, the entire disclose of which is incorporated herein by reference.

TECHNICAL FIELD

In general, the present disclosure may relate to fluid containment and transfer systems.

BACKGROUND

A wide variety of power equipment is distributed and purchased in the marketplace. Often, where such power equipment is purchased can be geographically removed from where it is manufactured. For this reason, shipping, storing, distributing, displaying, and ultimately transferring ownership of the power equipment is required. In the case of power equipment utilizing internal combustion engines, or requiring lubricant that must be periodically replaced or replenished, it can be undesirable to ship, store, distribute, display, or transfer the power equipment having the necessary fluids (such as lubricants) already present in the power equipment. For example, during any of the handling or shipping from manufacture to transfer there is the possibility that the power equipment may be dropped or otherwise oriented in a manner that could allow the fluids to escape and cause potential health, safety, environmental, or other concerns. For this reason, the necessary fluids are often shipped in separate sealed containers, or required to be purchased separately. As such, it is necessary for the ultimate user of the power equipment (and/or an intervening party) to properly prepare the power equipment for use. However, in many instances such preparation may be relatively messy, or require additional tools, such as funnels, and the like, to perform proper set-up. Such additional tools and/or mess can often be undesirable for the ultimate user of the power equipment.

SUMMARY

According to an implementation, a system for transferring fluid may include a container including an interior volume configured to hold a volume of fluid. The system may also include an adapter associated with the container for providing fluid communication with the volume of fluid. A receiver may be configured to be fluidly coupled with a reservoir. The receiver may be configured to releasably engage the adapter. The receiver may include a valve configured to be opened when the adapter is engaged with the receiver to allow fluid transfer between the container and the reservoir.

One or more of the following features may be included. The container may include one or more at least partially flexible walls. The container may include a generally rigid container. The adapter may be one or more of fixedly attached to the container and integrally formed with the container. The adapter may be removably coupled with the container.

One or more of the container and the adapter may include a seal configured to render the container generally fluid tight when the seal is in one or more of an intact condition and a sealed condition. The seal may be configured to be opened upon engagement of the adapter with the receiver to allow fluid communication between the container and the reservoir. The seal may include one or more of a foil and a membrane seal. The receiver may include a piercer configured to rupture the seal when the adapter is engaged with the receiver. The seal may include a re-sealable structure, the re-sealable structure may be configured to open upon engagement with the receiver and re-seal upon disengagement with the receiver.

The receiver may be configured to be removably coupled with the reservoir. The receiver and adapter may include cooperating twist-lock features for releasably engaging the receiver and the adapter. The valve of the receiver may include a check-valve configured to be opened when the adapter is engaged with the receiver and configured to be closed with the adapter is disengaged from the receiver. The volume of fluid may include engine oil, and the reservoir may include one of an engine oil reservoir and a pump lubricating oil reservoir.

According to another implementation, a method may include providing a container. The container may include an interior volume including a volume of fluid. The container may also include an adapter configured to provide fluid communication with the interior volume. The method may also include releasably engaging the adapter and a receiver that is in fluid communication with a reservoir. The method may further include transferring fluid between the container and the reservoir via the adapter and the receiver.

One or more of the following features may be included. Releasably engaging the adapter and the receiver may include releasably engaging cooperating twist-lock features associated with the adapter and the receiver.

One or more of the container and the adapter may include a seal preventing egress of the fluid from the interior volume. Releasably engaging the adapter with the receiving may include releasing the seal. The seal may include one of a foil member and a film member. Releasing the seal may include at least partially rupturing the seal by a piercer associated with the receiver. The receiver may include a check valve. Releasably engaging the adapter and the receiver may open the check valve to provide fluid communication with the reservoir.

The volume of fluid may include a volume of lubricating oil. The reservoir may include one or more of an engine oil reservoir and a lubricating oil reservoir of a pump. Transferring fluid between the container and the reservoir may include at least partially filling the reservoir with the lubricating oil.

According to yet another implementation, a fluid transfer system may include an adapter configured to be associated with a container including an interior volume configured for retaining a volume of fluid. The fluid transfer system may also include a receiver configured to be fluidly coupled with a fluid reservoir. The receiver may include a valve configured to be opened when the adapter is releasably engaged with the receiver to allow fluid transfer between the interior volume of the container and the fluid reservoir.

One or more of the following features may be included. The adapter may be one of permanently affixed and integrally formed with the container. The adapter may be configured to be removably coupled with the container. One or more of the adapter and the container may include a seal. The seal may be configured to be opened when the adapter is releasably engaged with the receiver to provide fluid communication with the interior volume of the container.

The receiver may be one or more of removably coupleable to a fill port of the reservoir and integrated into a cap for the fill port of the reservoir.

DESCRIPTION OF ILLUSTRATIVE EXAMPLE EMBODIMENTS

Figure 1:
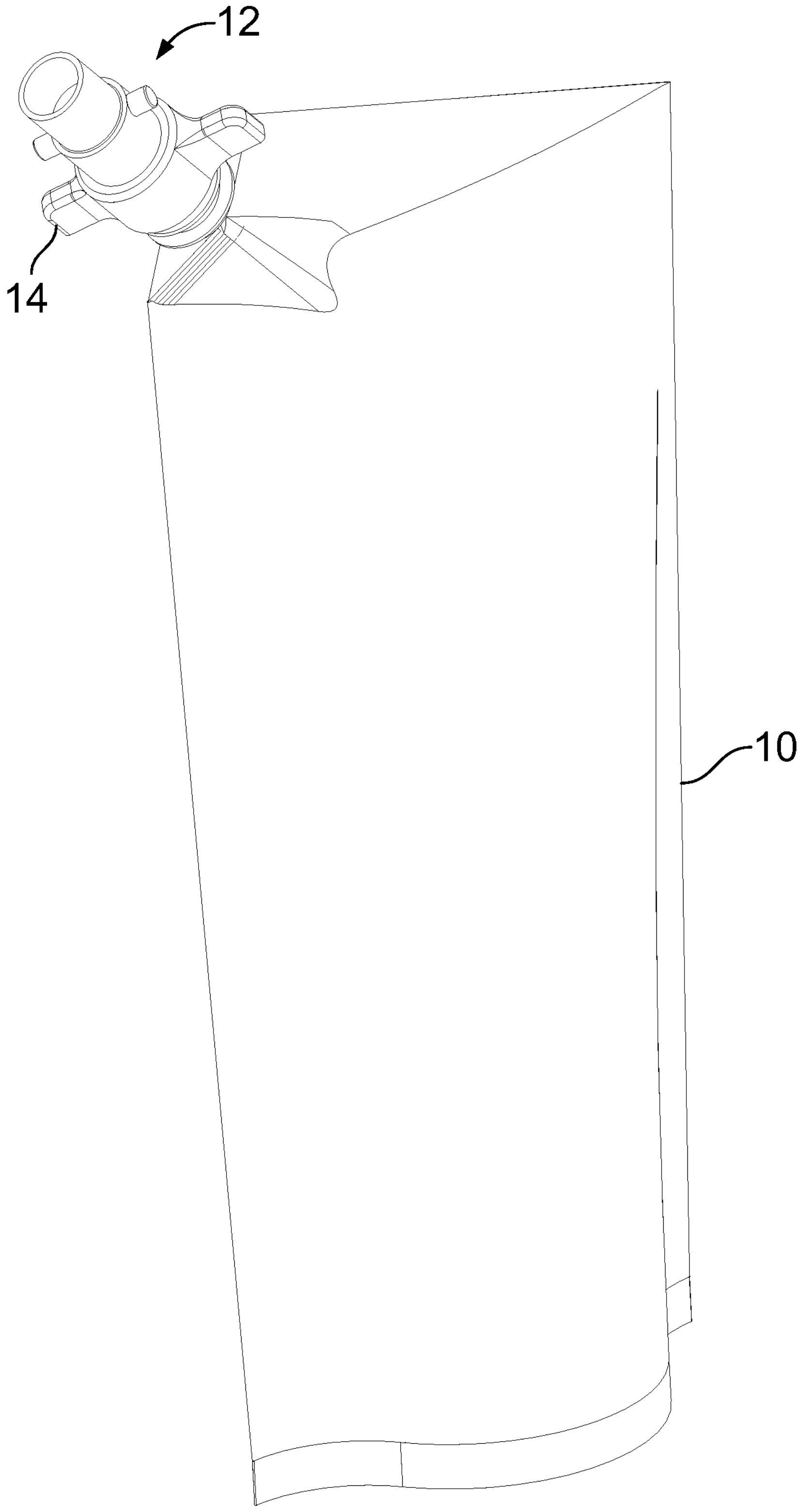
FIG. 1 is a perspective view of an illustrative example embodiment of a container and an adapter, consistent with an example embodiment.

In general, some embodiments of the present disclosure may provide a system for transferring a fluid between a container and a reservoir. In some embodiments, the container may be provided having an adapter that may releasably engage a receiver coupled to the reservoir. In some embodiments, the container may be sealed prior to being engaged with the receiver. Upon being engaged with the receiver, the seal of the container may be opened to allow fluid transfer between the container and the reservoir, via the receiver. Further, in some embodiments, the receiver may include a check valve arrangement. In some embodiments, the check valve may be in a closed position when the adapter is not engaged with the receiver. As such, the check valve may generally prevent ingress or egress to the reservoir via the receiver. The check valve may be opened when the adapter of the container is engaged with the receiver. In some embodiments, the engagement of the adapter with the receiver may cause the check valve to open, thereby allowing fluid transfer between the container and the reservoir via the receiver. Further, in some embodiment, disengagement of the adapter from the receiver may cause the check valve to close, thereby, again, preventing ingress or egress to the reservoir via the receiver. In some embodiments, the seal on the container may be opened by the engagement with the receiver. In some embodiments, the seal, once opened by engagement with the receiver may remain open, even after the adapter of the container is disengaged from the receiver. In some embodiments, the seal of the container may reseal when the adapter of the container is disengaged from the receiver, thereby once again rendering the container generally fluid tight (with respect to the seal of the container). In such an embodiment, the seal of the container may also be configured as a check valve.

In one particular illustrative example embodiment, a system consistent with the present disclosure may be utilized for transferring oil between a container and an oil reservoir of an engine (such as an engine crankcase), transferring oil between a container and an oil reservoir of a pump (e.g., which may be used for lubricating features of the pump during operation), transferring a cleaning solution between a container and a dispensing reservoir (such as a cleaning solution reservoir of a pressure washer or similar equipment). For example, commonly power equipment (e.g., pressure washers, generators, lawnmowers, snow blowers, etc.) are not shipped filled with oil as there may be a possibility of leakage during transport or storage. As such, upon initial usage of the power equipment it is necessary for the user to charge the power equipment with oil prior to use. Consistent with an illustrative example embodiment, the container may include a charge of oil (e.g., which in some embodiments may include a specific volume of oil corresponding to the desired volume of oil for the specific piece of associated power equipment). The container may be sealed in a generally fluid-tight condition, thereby rendering the container suitable for shipping, transporting, and/or storing with the piece of power equipment. Upon initial use or setup of the piece of power equipment, a receiver may be installed on (and/or may have previously been installed on, such as during manufacture or preparation for transport or sale) an oil fill port associated with the engine of the piece of power equipment, or other oil fill port (e.g., a fill port of an oil reservoir of a pump). With the receiver installed on the fill port, the adapter of the container may be engaged with the receiver, thereby allowing a predetermined, correct initial charge volume of oil to be transferred from the container to the oil reservoir of the engine or pump.

While the foregoing illustrative example embodiment relates to a system for providing a convenient arrangement for transferring an initial charge of oil from a container to an engine, it will be appreciated that the concepts consistent with the present disclosure may be utilized for a broad array of applications. For example, the container may include a volume of oil that is not selected to be a predetermined volume for use with a specific engine or pump (e.g., the container may include a nominal volume, such as one quart, etc.). Further, the system may be utilized for occasions other than providing an initial charge of oil (e.g., the system may be utilized in connection with routing maintenance oil changes). Further, and as indicated above, the system consistent with the present disclosure may be utilized for transferring any fluid from a container to a reservoir, and is not limited to transferring oil to an oil reservoir of a piece of power equipment. For example, the system may be utilized for charging a cleaning solution reservoir from a container, such as a cleaning solution reservoir for a pressure washer. Additionally, it will be appreciated that the system consistent with the present disclosure may be used in a variety of applications unrelated to power equipment.

Figure 2:
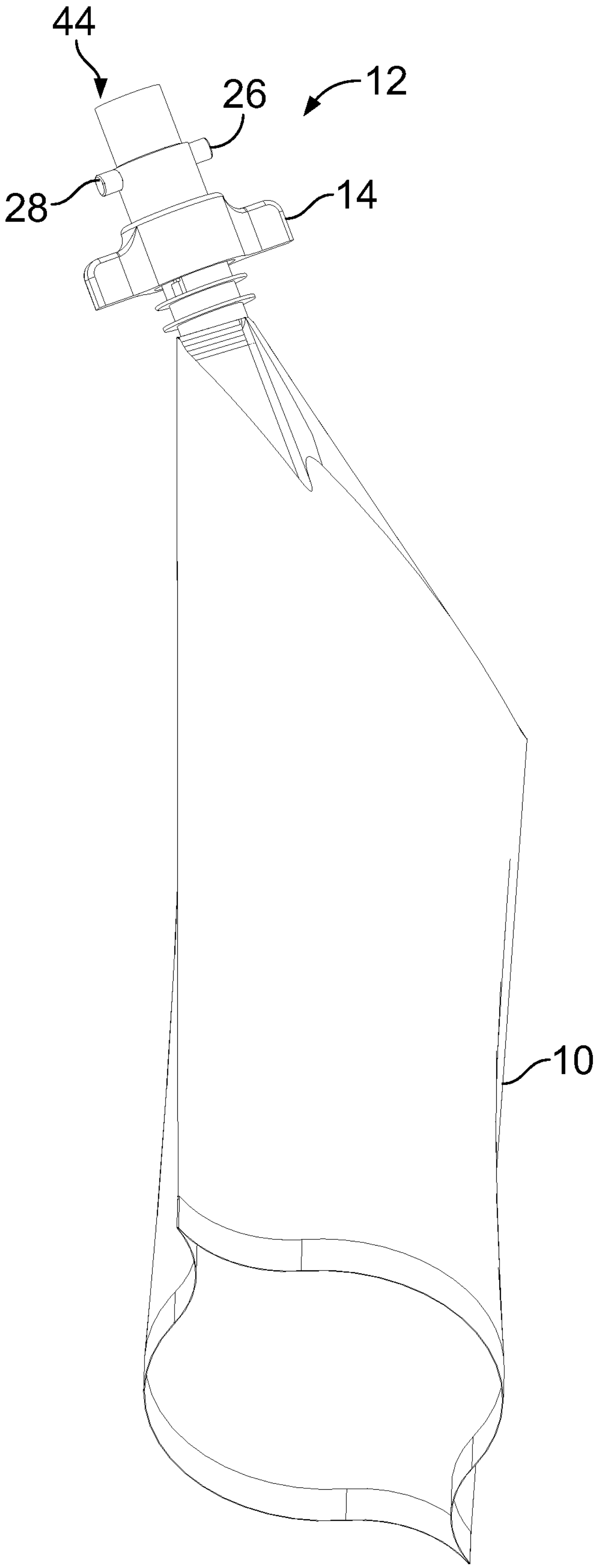
FIG. 2 is another perspective view of the container and adapter of FIG. 1.
Figure 3:
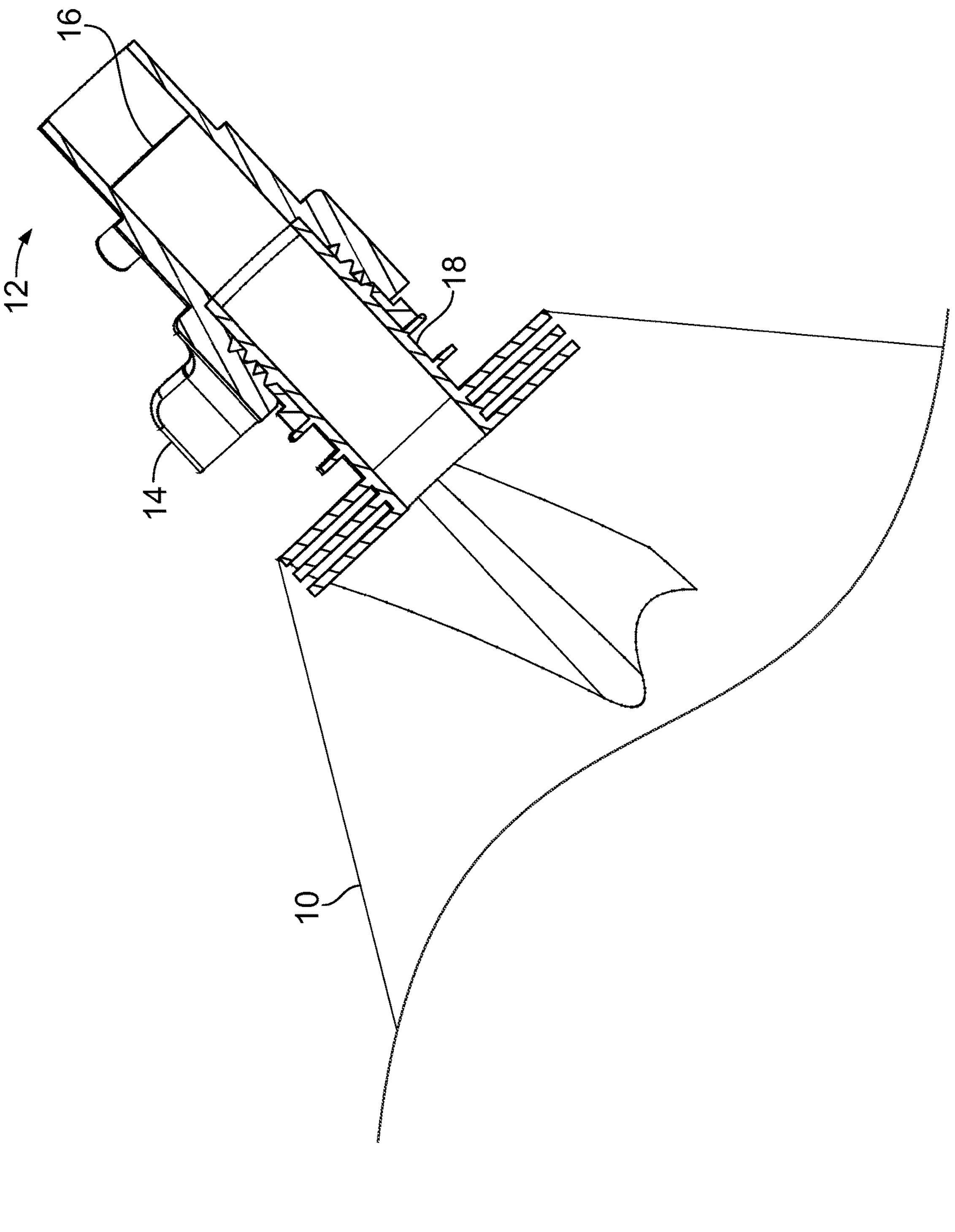
FIG. 3 is detailed cross-sectional view of an illustrative example embodiment of a container and an adapter, consistent with an example embodiment.

Referring to FIGS. 1-3, an illustrative example embodiment of a container 10, including an adapter 12, consistent with an embodiment of the present disclosure is shown. In the depicted embodiment, the container may include a flexible container having one or more at least partially flexible walls. In some such embodiments, the container may be configured as a flexible bag, or pouch, having sidewalls formed from a single, or multi-layered film, e.g., which may be heat-sealed or welding along their edges to form a fluid tight container. In some such implementations, the flexible container may have an at least partially variable volume (e.g., the container may be capable of at least partially collapsing) and/or an at least partially variable configuration and/or geometry (e.g., as the one or more at least partially flexible walls may allow distortion n the shape of the container. Consistent with some such embodiments, the flexible container may utilize relatively little material, e.g., which may result in less waste upon disposal of the flexible container. However, it will be appreciated that the container may be provided having a variety of configurations, for example having generally rigid walls defining a generally fixed configuration. It will be appreciated that a multitude of other configurations may be equally utilized.

Figure 4:
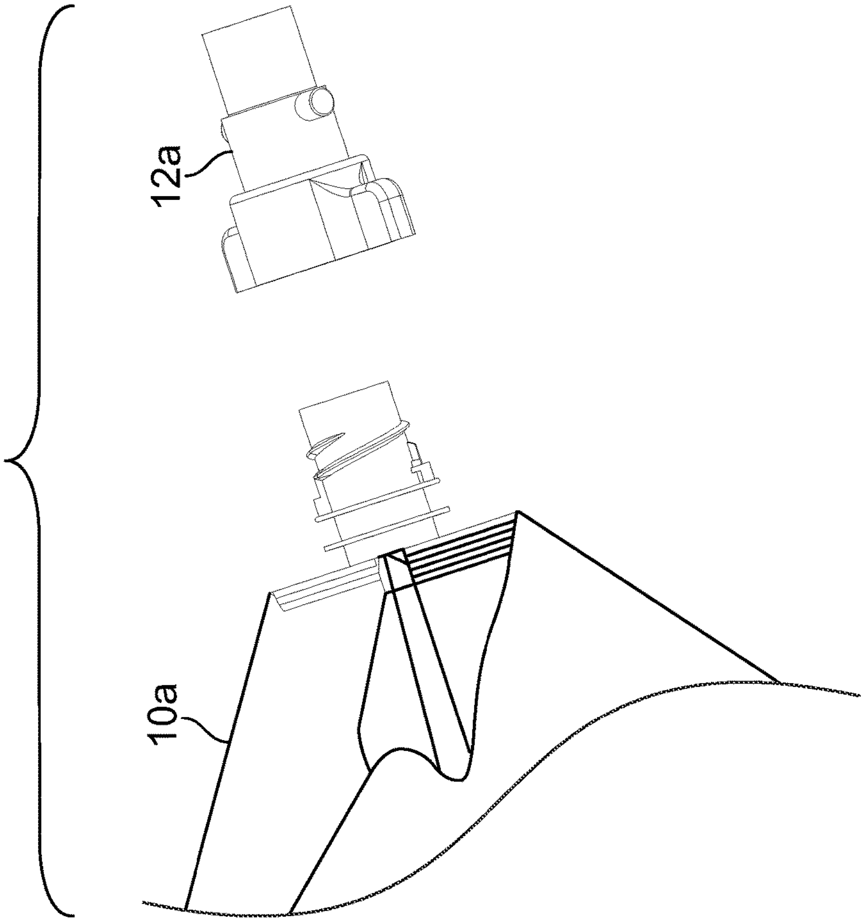
FIG. 4 depicts another view of a container and adapter, consistent with an example embodiment.

In various embodiments, the adapter may be fixedly attached to the container, and/or integrally formed with the container, and/or may be removeably coupled with the container. For example, as shown in FIG. 4, consistent with some illustrative example embodiments, the adapter 12*a* may include a separate component from the container 10*a*, and may be configured to be coupled to the container 10*a* during manufacture, may be coupled to the container 10*a* at the time of use, and/or may be coupled to the container at any other time. Consistent with an embodiment in which the adapter 12*a* may be removeably coupled with the container 10*a*, the container 10*a* and the adapter 12*a* may include cooperating features for removeably coupling the adapter 12*a* with the container 10*a*, such as, but not limited to, cooperating threaded features, cooperating press-fit features, cooperating snap-fit features, and the like. For example, in some embodiments the adapter and the container may include cooperating threaded features, which may allow the adapter to be screwed onto the container. To this end, in some illustrative example embodiments (e.g., as shown in FIGS. 1-4), the adapter 12 may include features that may facilitate threading the adapter 12 to the container 10, such as wings 14, knurling, ribbing, faceted surfaces, etc., which may aid in manipulation of the adapter 12 to facilitate manipulation and tightening of the adapter 12 to the container 10. It will be appreciated that a variety of other implementations may be utilized, including the absence of such features.

With particular reference to FIG. 3, a partial cross-sectional view of the illustrated example embodiment is shown. As generally discussed above, in some embodiments the container and/or the adapter may include a seal, e.g., which may render the container generally fluid-tight when the seal is intact and/or in a sealed or closed condition. In the illustrated example embodiment, the seal may include a membrane 16, such as a foil membrane, a polymeric film, and/or a composite membrane (such as a multi-layered membrane including one or more layers of polymeric film alone and/or in combination with one or more foil membranes), and/or another structure that may form a seal relative to the interior volume defined by the container. Consistent with the illustrated example embodiment, the membrane may be at least partially pierced, ruptured, torn, sliced, and/or broken, etc., to allow fluid transfer with the interior volume of the container 10 (e.g., either into or out of the interior volume of the container, as will be discussed in greater detail below). Consistent with the illustrated example embodiment in which the container 10 may include a flexible bag, or pouch, the container 10 may include a nipple 18, e.g., through which fluid may be transferred from/to the interior volume of the container. Consistent with such an embodiment, the adapter 12 may be coupled to the container 10 via the nipple 18. In some such embodiments, the nipple 18 may extend at least partially into, and/or through, the adapter. In one such embodiment, the seal 16 may be disposed on, or within, the nipple 18. In some embodiments, the seal 16 may be disposed on, or within, the adapter 12. Further, in some embodiments, both the container 10 (including but not limited to, the nipple 18 of the container 10) and the adapter 12 may include seals.

Figure 5:
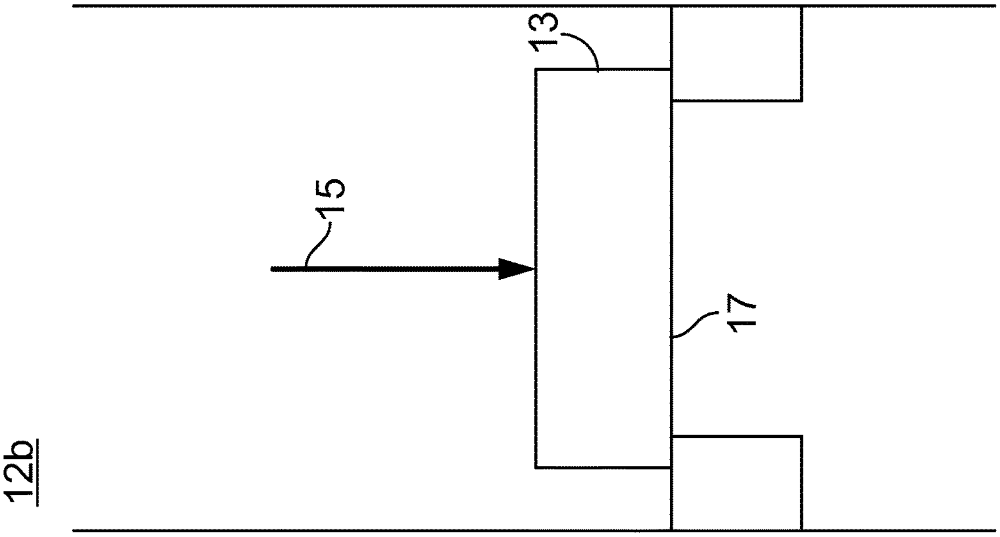
FIG. 5 schematically depicts an adapter including a resealable valve.

While the illustrated example embodiment of FIG. 3 is shown and described as including a seal in the form of a membrane, which may be pierced and/or ruptured, to allow fluid transfer with an interior volume of the container, in some embodiments the seal may include a re-sealable structure. For example, the seal may include a check valve, e.g., which may include a displaceable sealing member that may be biased toward a sealed position. When engaged with the receiver, as described in greater detail below, the sealing member may be moved to an opened position, which may allow fluid transfer with the interior volume of the container. An example of a displaceable sealing member may include, but is not limited to, a ball, a poppet, a sealing disc, or the like. For example, as schematically shown in FIG. 5, in some embodiments, an adapter 12*b* may include a sealing member 13 may be biased by a biasing member 15 (e.g., by a spring or other elastic member or structure) toward a sealed condition, for example, in which the sealing member 13 may engage a cooperating seat structure 17. It will be appreciated that a variety of other check valve arrangements may also be utilized. Consistent with some such embodiments, the seal may be opened when the adapter is engaged with the receiver (as described in greater detail below), and the seal may be closed (e.g., re-sealed) when the adapter is disengaged from the receiver, as such, the occurrence, or degree, of spillage of fluid may be reduced, for example, if the adapter is disengaged from the receiver during a fluid transfer process and/or if any residual fluid remains in the container when the adapter is disengaged from the receiver. Further, the use of a re-sealable seal may allow for less than all of the fluid to be transferred from the container, with the un-transferred volume of fluid being retained in the container in a sealed condition. Additionally, the use of a re-sealable seal may allow fluid to be transferred to the container, and allow the fluid to be retained in the container in a generally fluid-tight condition. As noted above, in some illustrative example embodiments, the sealing arrangement (e.g., which may include a check valve arrangement) may be associated with the adapter, Further, in some illustrative example embodiments, the sealing arrangement (e.g., which may include a check valve arrangement, as described with respect to FIG. 5) may be associated with the container (e.g., as by being disposed within the nipple of the container).

Figure 6:
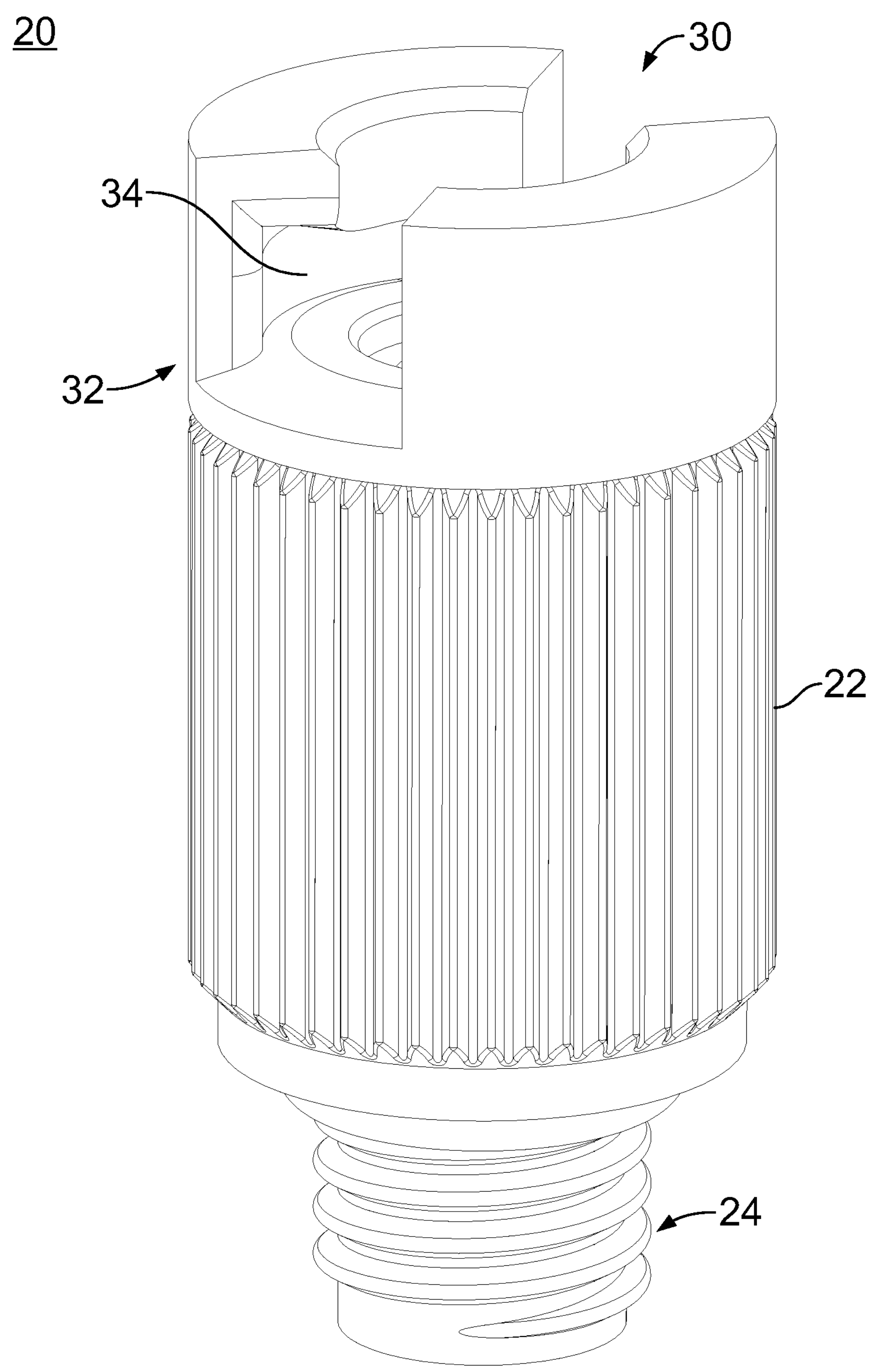
FIG. 6 is perspective view of an illustrative example embodiment of a receiver, consistent with an example embodiment.
Figure 7:
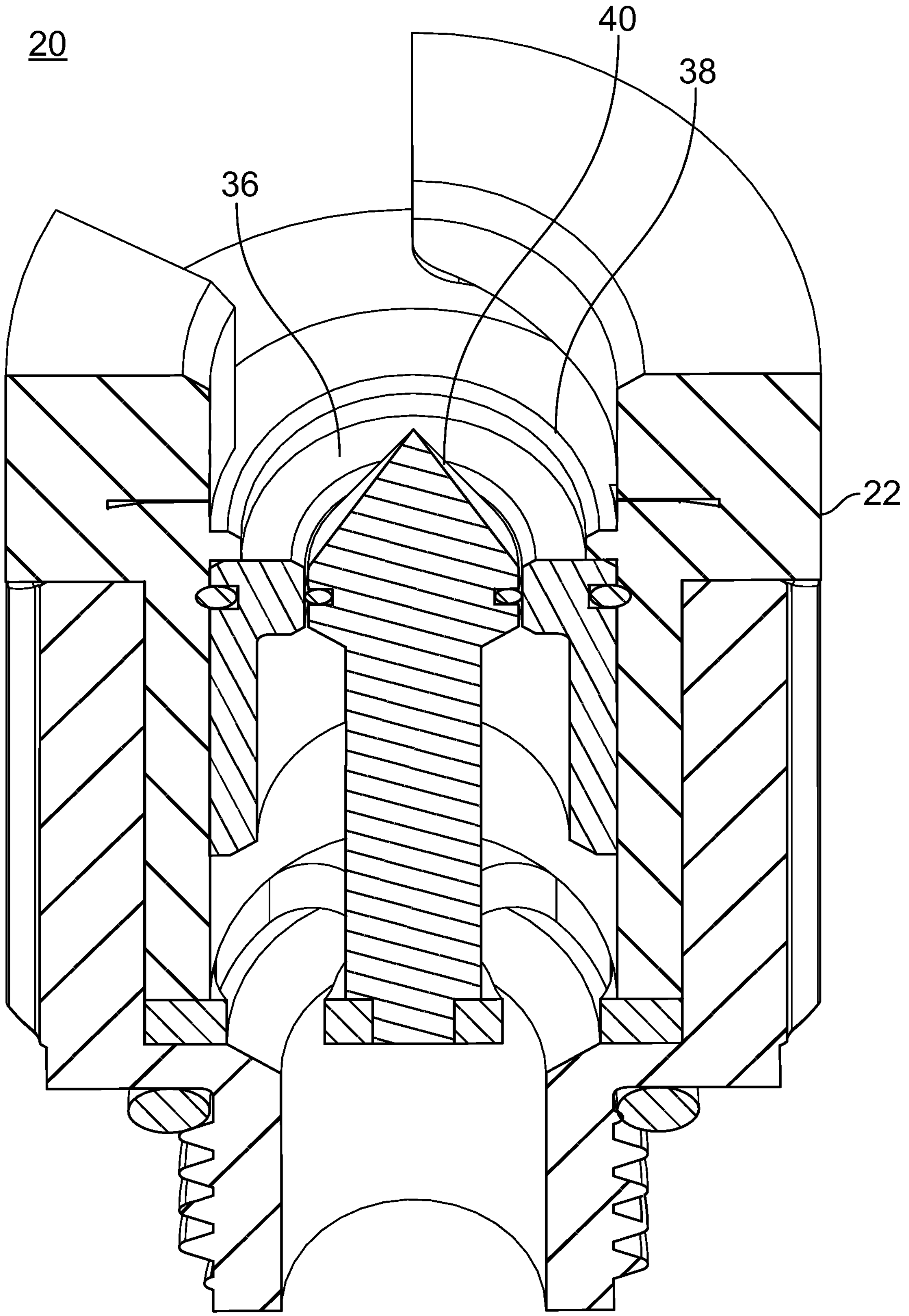
FIG. 7 is a cross-sectional view of an illustrative example embodiment of a receiver, consistent with an example embodiment.

Referring to FIGS. 6-7, an illustrative example embodiment of a receiver 20 is shown. As generally discussed above, the receiver may be configured to be coupled with a fluid reservoir, such as an oil reservoir for an engine (e.g., such as the crankcase), an oil reservoir for a pump, and/or another fluid reservoir, and may provide fluid communication with an interior volume of the fluid reservoir. Consistent with the illustrated example, the receiver may include a body 22 including a threaded portion 24, which may be configured to be threadably coupled with an engine oil reservoir or a pump oil reservoir. For example, the threaded portion 24 may be configured to be threaded into an oil fill port of an engine or a pump. It will be appreciated that other coupling arrangements may be utilized, e.g., depending upon the configuration of the reservoir with which the receiver is intended to be used. In some embodiments, the receiver 20 may generally be configured, and/or intended, to be coupled with the oil fill port of an engine or pump by removing the normal fill plug or cap and threading the receiver 20 into the oil fill port. In some implementations, the receiver 20 may be intended to be coupled with the reservoir for filling the reservoir, and then to be removed from the fill port and replaced with the fill plug or cap once the reservoir has been filled. In other implementations, the receiver 20 may be configured and/or intended to replace, be used in place of, and/or integrated into, a typical fill plug or cap. For example, in some implementations, the engine or pump may come equipped with the receiver 20 as a fill plug or cap. In some implementations, the receiver 20 may be configured to be utilized as a replacement for a fill plug or cap that the engine or pump originally came equipped with.

As generally discussed above, in some embodiments the adapter 12 of the container 10 may be configured to be releasably coupled with the receiver 20. In the illustrated example embodiment, the adapter 12 may include features (e.g., protrusions 26, 28) to effectuate a twist-lock releasable coupling with the receiver 20. Correspondingly, the receiver 20 may include longitudinal slots (e.g., slots 30, 32) and circumferential grooves (e.g., groove 34 depicted in FIG. 4) configured to cooperate with the protrusions 26, 28 of the adapter to effectuate twist-lock coupling between the adapter 12 and the receiver 20. It will be appreciated that a variety of other releasable coupling arrangements may equally be utilized. For example, the adapter and receiver may include cooperating threaded features, press-fit features, snap-fit features, etc., which may allow the adapter to be releasably coupled with the receiver.

In some embodiments consistent with the present disclosure, the receiver may include a check-valve configuration. The check-valve may be opened as a result of coupling the adapter with the receiver. When the adapter is not coupled with the receiver, the check-valve may be in a closed position. As such, when the adapter is not coupled with the receiver, and the receiver is in a closed position, the receiver may prevent, and/or reduce the likelihood of, foreign matter entering the reservoir through the fill port. For example, in implementations in which the receiver may be intended to be associate with an oil fill port of an engine or pump, it may be desirably to prevent, and/or reduce the occurrence of, the introduction of foreign material (e.g., dust, dirt, debris contaminants, moisture, etc.) into the oil reservoir, which may cause damage to the engine or pump, and/or otherwise be undesired. Additionally/alternatively, the check-valve configuration may prevent and/or reduce the extent and/or likelihood of oil spilling from the oil reservoir, e.g., if the engine or pump is tipped, etc.

With particular reference to FIG. 7, the illustrated example embodiment of the receiver 20 may include a sliding member 36, which may be biased toward an upper seat 38 of the body 22. In some embodiments, the sliding member 36 may be biases toward the upper seat 38 via a spring (not shown), or other elastic member. In some embodiments, the sliding member 36 may include one or more seals (such as O-rings) that may sealing engage the inner bore of the body 22. In some embodiments, the sliding member may additionally/alternatively sealingly engage the upper seat to, at least in part, effectuate closing of the check-valve arrangement. It will be appreciated that while sliding member 36 is generally shown as an elongated circular profile member, other configurations may equally be utilized. Additionally, it will be appreciated that various additional and/or alternative check-valve arrangements may be utilized, e.g., which may generally have a configuration as described with respect to FIG. 5 (i.e., generally including a sealing member biased towards a seat structure by a biasing member, wherein the sealing member may be displaced from the seat structure, against the biasing force of the biasing member, to allow fluid communication between the sealing member and the seat structure).

Figure 8:
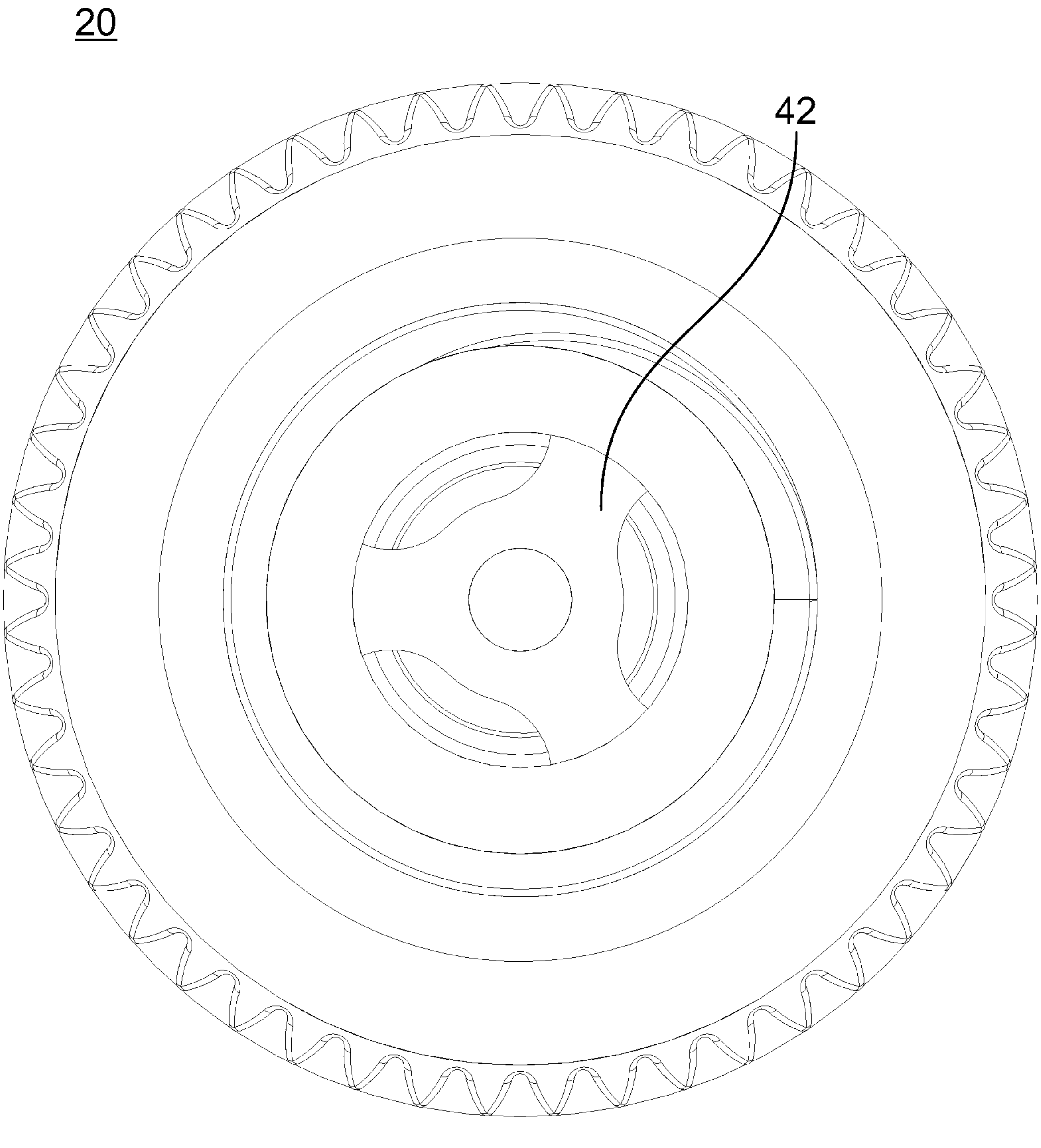
FIG. 8 is a plan view of a bottom (e.g., reservoir facing) end of an illustrative example embodiment of a receiver, consistent with an example embodiment.

As generally described above, in some embodiments, the container 10 and/or the adapter 12 may include a seal, such as a membrane, that may be pierced, ruptured, and/or otherwise disrupted to allow fluid transfer with the container 10. Consistent with one such embodiment, the receiver 20 may include a piercer 40. Piercer 40 may be configured to pierce, or rupture, the seal 16 of the container 10 and/or the adapter 12. As generally shown, e.g., in FIG. 7, the piercer 40 may include a generally elongated member having a pointed end (e.g., to facilitate puncturing the seal 16). As also shown in FIG. 7, in the illustrated example embodiment, the sliding member 36 may generally be configured having an upper wall with a hole configured to receive at least a portion of the piercer 40 therethrough. In some such embodiments, the sliding member 36 and/or the piercer 40 may include a seal (such as an O-ring, or other seal), which may provide a generally fluid-tight seal between the piercer 40 and the sliding member 36 when the check-valve arrangement is in a closed position. Further, as shown, in some embodiments the piercer may have an enlarged distal portion (e.g., adjacent the point of the piercer), and a smaller diameter proximal portion. As such, when the sliding member is displaced away from the upper seat 38 (i.e., the check-valve arrangement is in an open position), a fluid passage may be provided between the upper opening of the sliding member 36 and the smaller diameter portion of the piercer 40. Accordingly, when the check-valve arrangement is in the open position, fluid may be allowed to travel through the receiver 20 via the fluid passage. It will be appreciated that other configurations may equally be utilized. For example, the piercer may include one or more grooves or channels, e.g., which may be exposed above the sliding member when the check-valve arrangement is in the open position. Additionally/alternatively, the piercer may have a proximal geometry that is different than the distal geometry (e.g., which may form a seal with the sliding member when the check valve is in the closed position), thereby creating fluid passages that are exposed when the check-valve arrangement is in the open position. Referring also to FIG. 8, in an illustrated embodiment, the receiver 20 may include a piercer support 42, e.g., which may support the piercer 40 in the desired position. As shown, in some embodiments, the piercer support 42 may include one or more fluid passages, e.g., which may allow for fluid transfer through the receiver.

It will be appreciated that other check-valve arrangements may equally be utilized. For example, rather than the sliding member and the piercer being separate components, the sliding member may include a protrusion, e.g., which may facilitate puncturing or rupturing the seal of the container and/or adapter. Further, the sliding member may be configured to be displaced from an upper seat of the receiver (e.g., which may provide a generally fluid-tight arrangement in the closed position of the check-valve arrangement. The interior of the receiver may include an opening that is larger than the sliding member, e.g., to provide a fluid passage through the receiver around the sliding member. It will be appreciated that still further check-valve arrangements may also be utilized. Additionally, as described above, in some illustrative example embodiments, the adapter may include a check valve arrangement (e.g., rather than a rupturable seal). Consistent with some such arrangements, rather than rupturing a seal, the piercer of the receiver may serve to displace the sealing member away from the seat structure, against the biasing force of the biasing member, to thereby open the check valve of the adapter and/or of the container.

Figure 9:
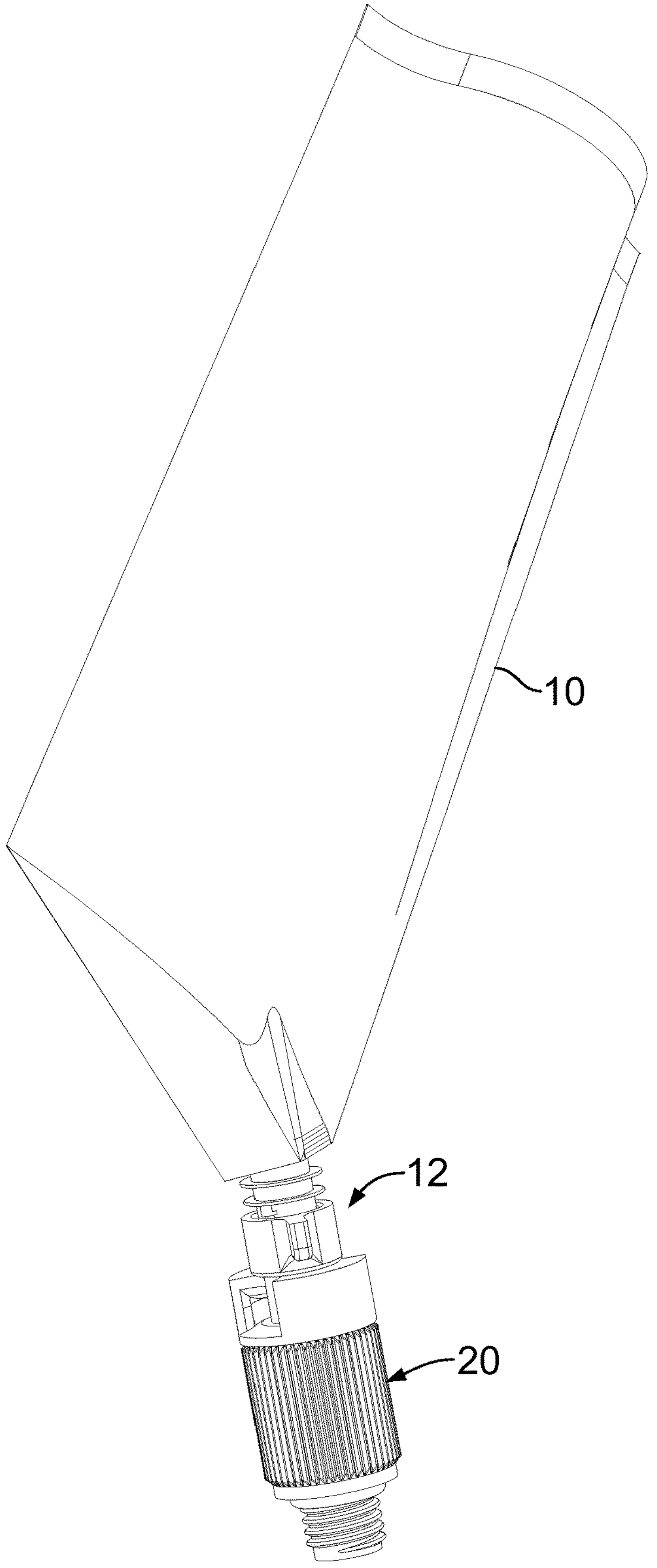
FIG. 9 is a perspective view of an illustrative example embodiment of a container and adapter coupled with a receiver, consistent with an example embodiment.
Figure 10:
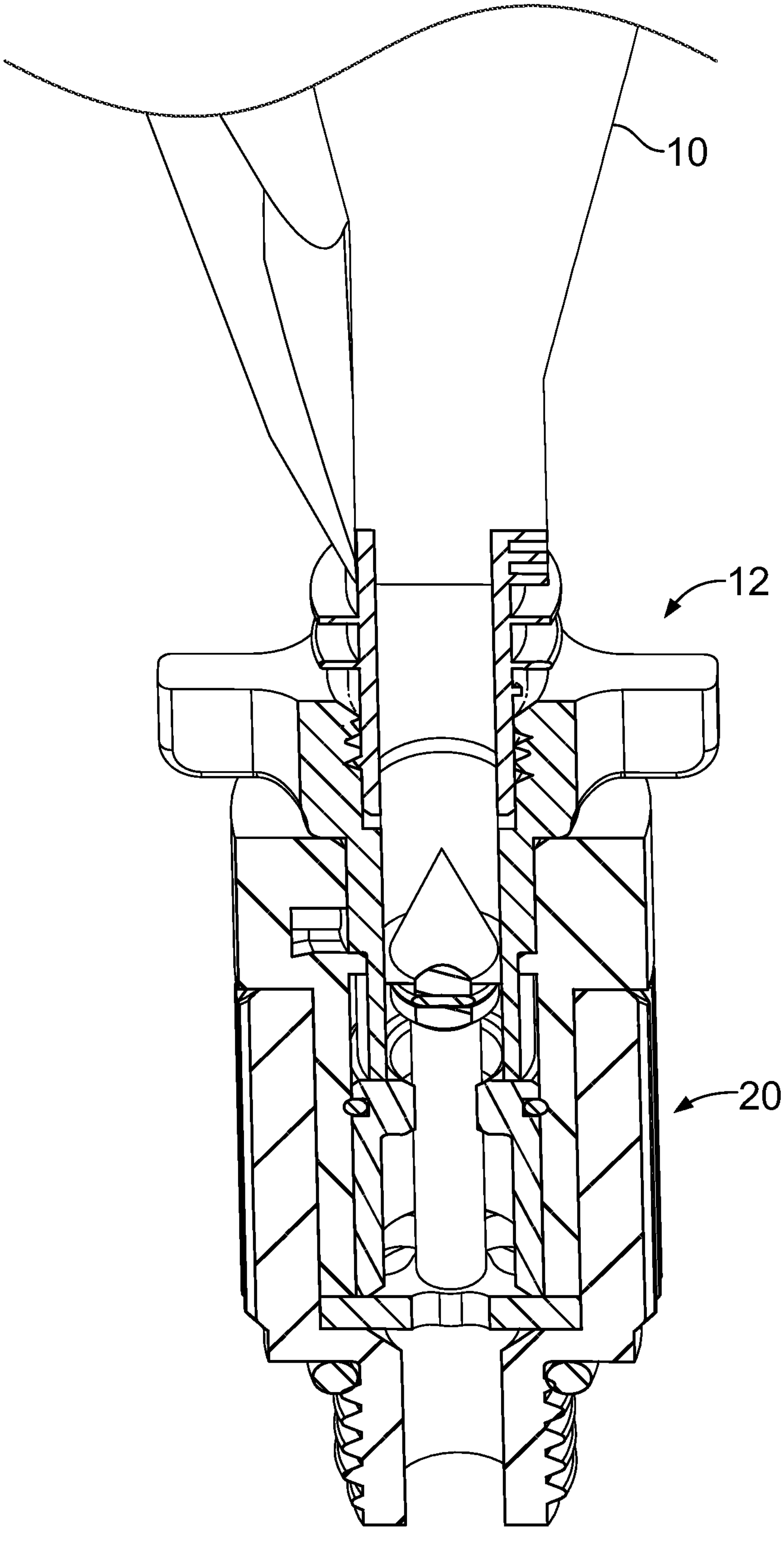
FIG. 10 is a cross-sectional view of an illustrative example embodiment of a container and adapter coupled with a receiver, consistent with an example embodiment.
Figure 11:
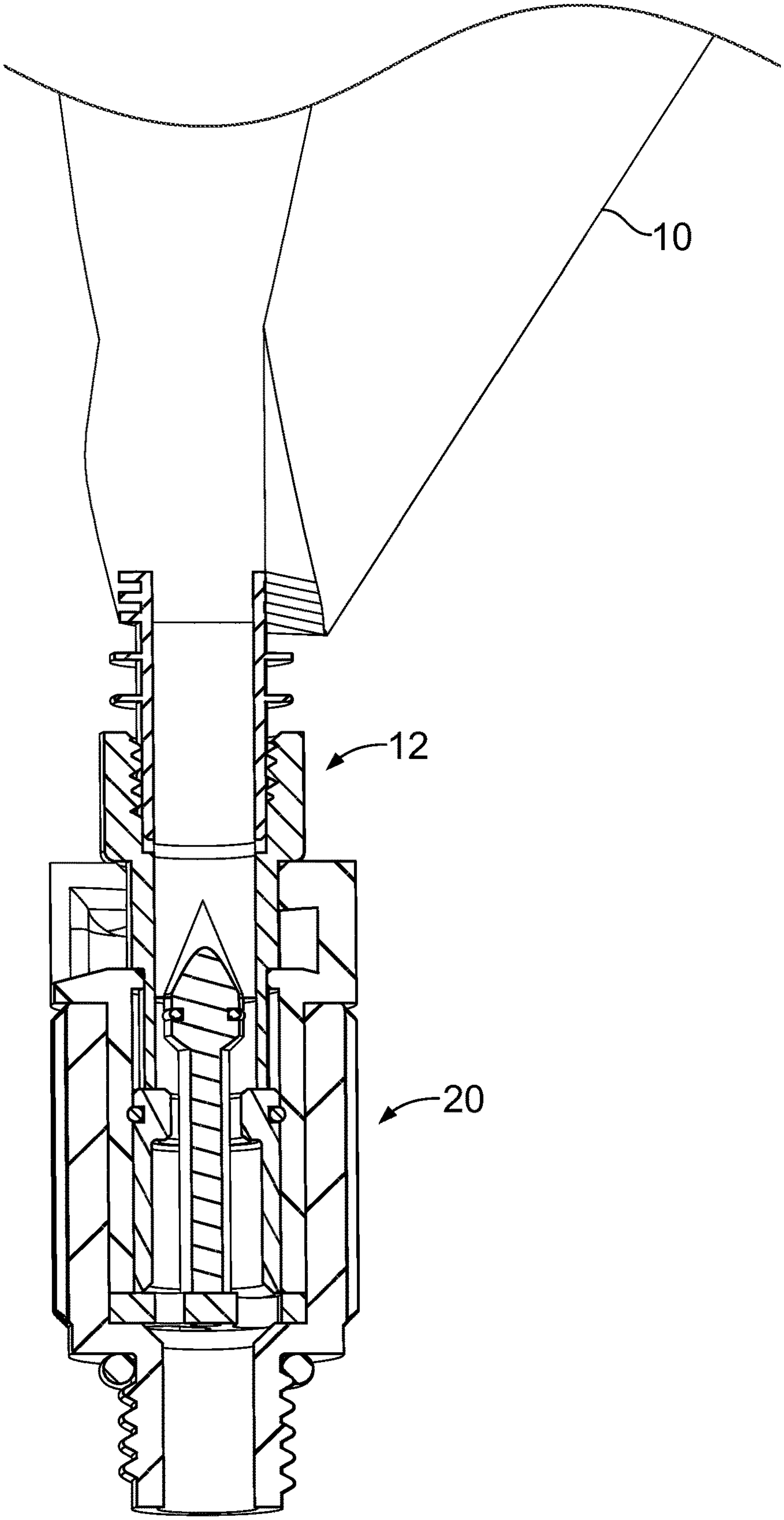
FIG. 11 is another cross-sectional view of an illustrative example embodiment of a container and adapter coupled with a receiver, consistent with an example embodiment.

With reference to FIGS. 9-11, operation of the illustrative example fluid transfer system is generally depicted. As shown, and as generally discussed above, to effectuate fluid transfer between the container 10 and the receiver 20 (and thereby fluid transfer between the container and a reservoir to which the receiver may be attached), the adapter 12 may be releasably coupled with receiver. Consistent with the illustrated example embodiment, which may utilize a twist-lock configuration, the protrusions 26, 28 of the adapter 12 may be inserted into the longitudinal slots 30, 32, and may be rotated to be positioned in the circumferential grooves (e.g., groove 34 and a corresponding groove associated with longitudinal slot 30 of the depicted illustrated embodiment). Once the protrusions are positioned in the circumferential grooves, the adapter and the receiver may resist separation, e.g., until the adapter and receiver are rotated relative to one another to again align the protrusions with the longitudinal slots.

As shown, releasably coupling the adapter 12 and the receiver 20 may further cause the adapter (e.g., distal end 44) to contact the sliding member 36, and slidingly displace the sliding member 36 from sealing contact with the enlarged distal portion of the piercer 40, e.g., to move the check-valve arrangement to the open position. Slidingly displacing the sliding member 16 may, accordingly, additionally expose the fluid passage formed between the proximal portion of the piercer 30 and the opening in the upper surface of the sliding member 36. Further, releasably coupling the adapter 12 and the receiver 20 may cause the piercer 40 to penetrate the seal 16 of the container 10 and/or the adapter 12. Accordingly, the penetration of the seal 16 and the sliding displacement of the sliding member 36 (i.e., moving the check-valve arrangement to the open position) may open the container 10 and the receiver 20 for fluid transfer therebetween.

Consistent with the present disclosure, the fluid transfer system may be utilized in a variety of implementations. For example, as generally discussed above, the fluid transfer system may allow an appropriate initial charge of oil to be shipped and/or sold with an engine (e.g., a piece of power equipment including an engine), a pump, or other device. The fluid transfer system may allow the initial charge of oil to be transferred during initial setup/operation of the engine or pump, e.g., with reduced likelihood of spillage and with improved convenience. Similarly, a fluid transfer system consistent with the present disclosure may facilitate charging the engine or pump with oil during routine maintenance. In this regard, the receiver may be installed on the oil fill port as part of the maintenance procedure (e.g., replacing the typical plug or cap), and may be removed after the maintenance has been conducted. Additionally/alternatively, the receiver may be utilized as the plug or cap for the oil fill port, and may be left in place during operation of the engine or pump. Further, in some embodiments, the fluid transfer system may be utilized to collect oil drained from an engine or pump. For example, the receiver may be installed on the fill port, and with the container and adapter releasably coupled with the receiver, the engine or pump may be tipped and/or oriented to allow the oil from the engine or pump to be drained into, and collected by, the container. In a similar manner, in which the engine or pump include an oil drain plug, the receiver may be installed in place of the oil drain plug, and may be used to collect oil from the engine or pump by releasably coupling the container and adapter to the receiver. In some embodiments, the receiver may be provided with an engine or pump. In some such embodiments, the container (e.g., including a charge of oil) and the adapter may also be provided with the engine or pump (e.g., for initially charging the engine or pump with oil). Further, in some embodiments, the container (alone or in combination with the adapter) may be obtained and used, e.g., for subsequent oil changes. In some such embodiments, the container may be provided alone and the adapter may be a reusable component (e.g., by being releasably coupled with the newly acquired container). In still further embodiments, the receiver and adapter (alone and/or with the container) may be obtained as a kit, and may be used for conducting maintenance on an engine or pump. Further, containers of oil (or other fluid, either alone or with an adapter) may be separately obtained, e.g., for use with the receiver (and, in some instances, re-use of a previously obtained adapter) during maintenance. In some of the foregoing example embodiments, the receiver may be utilized in place of the typical reservoir plug or cap, e.g., as a conversion installation to allow fluid transfer using a container and adapter.

While the foregoing description has been provided in the context of effecting oil transfer with an engine or pump, it will be appreciated that embodiments consistent with the present disclosure may be utilized for any suitable fluid transfers. For example, the embodiments consistent with the present disclosure may be used for filling (or draining) cleaning solution reservoir, a hydraulic system, coolant systems, and/or any other fluid systems in which it may be desirable to simplify the fluid transfer, reduce the likelihood, and/or extent, of spillage, and/or to provide an automatic closure of a fluid fill and/or drain port.

While various illustrative example embodiments have been described herein, including particular features and combinations of features, it will be appreciated that implementations may be provided consistent with the present disclosure that incorporate various combinations of elements and features described across the various illustrative example embodiments, and/or that may incorporate additional and/or alternative elements and features and/or combinations of elements and features. As such the described illustrative example embodiments should be understood as describing possible features, objectives, and advantages of the present disclosure, and are intended for illustrative purposes only. Further, the elements, features, and concepts of the present disclosure are susceptible to modification and variation, as will be appreciated by those having skill in the art. As such, the scope of the present invention should not be construed as limited to any of the described embodiments.

What is claimed is:

1. A system for transferring fluid comprising:

a container including an interior volume configured to hold a volume of fluid;

an adapter associated with the container for providing fluid communication with the volume of fluid;

a receiver configured to be fluidly coupled with a reservoir, the receiver configured to releasably engage the adapter, and including a valve that is physically opened by engagement between the adapter and the receiver to allow fluid transfer between the container and the reservoir, wherein the receiver includes a sliding member biased toward an upper seat, the valve being in a closed position when the sliding member is engaged with the upper seat, and the adapter includes a distal end that displaces the sliding member away from the upper seat when the receiver is releasably engaged with the adapter moving the valve to an opened position allowing fluid transfer through the adapter and the receiver.

2. The system according to claim 1, wherein the container includes one or more at least partially flexible walls.

3. The system according to claim 1, wherein the container includes a generally rigid container.

4. The system according to claim 1, wherein the adapter is one or more of fixedly attached to the container and integrally formed with the container.

5. The system according to claim 1, wherein the adapter is removably coupled with the container.

6. The system according to claim 1, wherein:

one or more of the container and the adapter includes a seal configured to render the container generally fluid tight when the seal is in one or more of an intact condition and a sealed condition; and wherein the seal is configured to be opened upon engagement of the adapter with the receiver to allow fluid communication between the container and the reservoir.

7. The system according to claim 6, wherein the seal includes one or more of a foil and a membrane seal.

8. The system according to claim 7, wherein the receiver includes a piercer configured to rupture the seal when the adapter is engaged with the receiver.

9. The system according to claim 6, wherein the seal includes a re-sealable structure, the re-sealable structure configured to open upon engagement with the receiver and re-seal upon disengagement with the receiver.

10. The system according to claim 1, wherein the receiver and adapter include cooperating twist-lock features for releasably engaging the receiver and the adapter.

11. The system according to claim 1, wherein the valve of the receiver includes a check-valve configured to be opened when the adapter is engaged with the receiver and configured to be closed with the adapter is disengaged from the receiver.

12. The system according to claim 1, wherein the volume of fluid includes engine oil, and wherein the reservoir includes one of an engine oil reservoir and a pump lubricating oil reservoir.

13. A fluid transfer system comprising:

an adapter configured to be associated with a container including an interior volume configured for retaining a volume of fluid;

a fluid reservoir having a threaded fill port, wherein the reservoir includes one or more of:

an oil reservoir of an engine;

an oil reservoir of a pump; and a dispensing reservoir of a pressure washer;

a receiver configured to be fluidly coupled with the fluid reservoir, the receiver including a valve configured to be opened by engagement between the adapter and the receiver to allow fluid transfer between the interior volume of the container and the fluid reservoir, the valve including a sliding member configured to be slidingly displaced upon engagement with the adapter to move the valve to an open position, and wherein the receiver one or more of:

includes a threaded portion for removably coupling to the fill port of the fluid reservoir and is integrated into a cap for the fill port of the fluid reservoir, the cap being removably couplable with the fill port of the fluid reservoir.

14. The fluid transfer system according to claim 13, wherein the adapter is one of permanently affixed and integrally formed with the container.

15. The fluid transfer system according to claim 13, wherein the adapter is configured to be removably coupled with the container.

16. The fluid transfer system according to claim 13, wherein:

one or more of the adapter and the container include a seal; and the seal is configured to be opened when the adapter is releasably engaged with the receiver to provide fluid communication with the interior volume of the container.

* * * * *